United States Patent [19]

Tateyama

[11] Patent Number: 4,674,797
[45] Date of Patent: Jun. 23, 1987

[54] ANGULAR POSITION ADJUSTABLE HEADREST

[75] Inventor: Tomoyoshi Tateyama, Kanagawa, Japan

[73] Assignees: Ikeda Bussan Co., Ltd., Ayase; Ikeda Kinzokukogyo Co., Ltd., Yamato, both of Japan

[21] Appl. No.: 843,681

[22] Filed: Mar. 25, 1986

[51] Int. Cl.⁴ .............................. B60N 1/06; A47C 7/38
[52] U.S. Cl. ....................................... 297/408; 297/391
[58] Field of Search ................. 297/408, 409, 356, 391

[56] References Cited

U.S. PATENT DOCUMENTS

| 3,484,831 | 12/1969 | Higuchi | 297/356 X |
| 4,370,898 | 2/1983 | Maruyama | 297/408 |
| 4,558,903 | 12/1985 | Takagi | 297/356 |

FOREIGN PATENT DOCUMENTS

| 0010867 | 5/1980 | European Pat. Off. | |
| 0024687 | 3/1981 | European Pat. Off. | 297/408 |
| 0121899 | 10/1984 | European Pat. Off. | |
| 56-34464 | 4/1981 | Japan. | |
| 976404 | 11/1964 | United Kingdom. | |
| 1139504 | 1/1969 | United Kingdom. | |
| 1537551 | 12/1978 | United Kingdom. | |
| 2016916 | 10/1979 | United Kingdom. | |
| 2032770 | 5/1980 | United Kingdom. | |

Primary Examiner—James T. McCall
Attorney, Agent, or Firm—Schwartz, Jeffery, Schwaab, Mack, Blumenthal & Evans

[57] ABSTRACT

Herein disclosed is an angular position adjustable headrest which comprises a headrest frame. The headrest frame is arranged to pivot between two extreme positions about the axis of a pivot shaft which extends between two spaced brackets secured to a stay of the headrest. A position locking device is arranged to lock the headrest frame to selected one of angular positions of the headrest frame relative to the brackets. A lock cancelling plate is pivotally disposed about the pivot shaft, which disables the position locking device when the headrest frame is pivoted to one of the two extreme positions.

13 Claims, 6 Drawing Figures

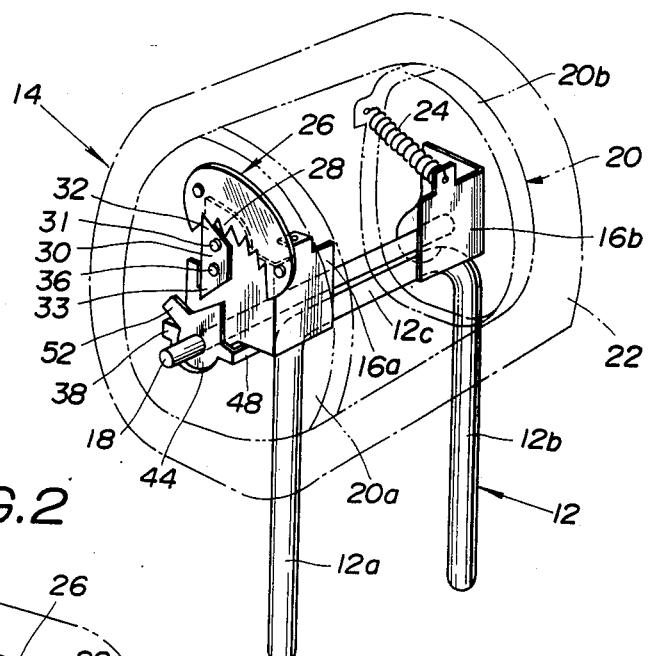
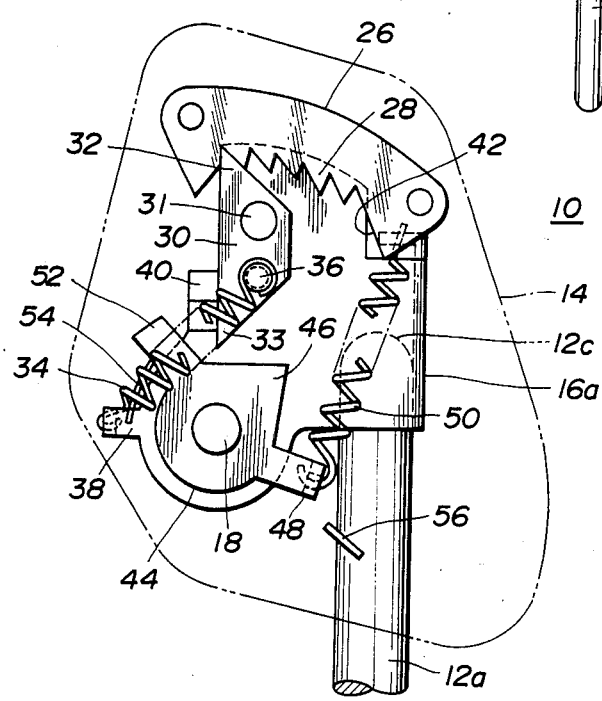

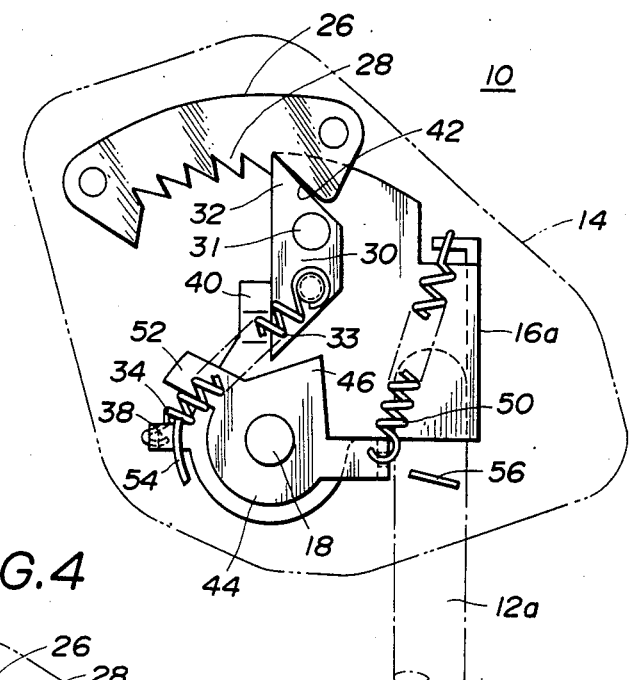
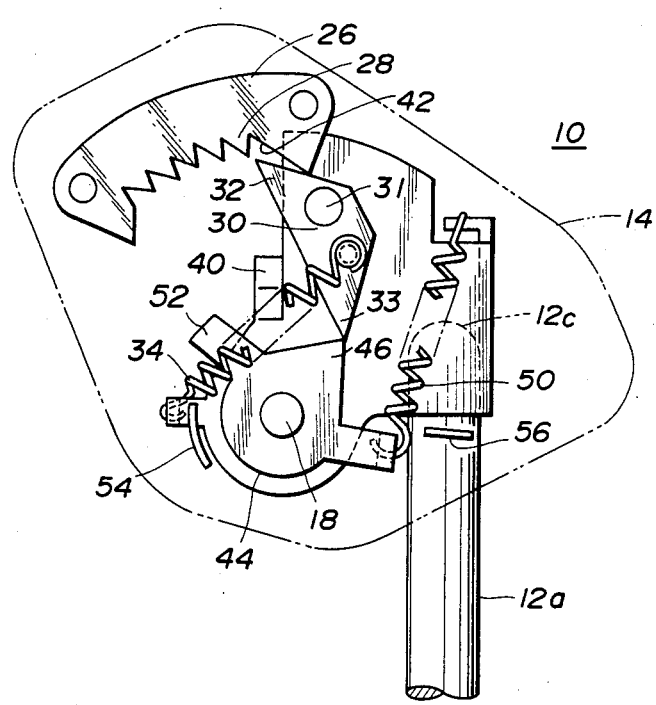

ANGULAR POSITION ADJUSTABLE HEADREST

BACKGROUND OF THE INVENTION

1. Field of the Invention

The present invention relates to a headrest mounted on a seatback of a seat for supporting the head of a seat occupant, and more particularly to a headrest which is pivotable to a desired angular position by hands relative to the seatback.

2. Description of the Prior Art

Hitherto, various kinds of headrests have been proposed and put into practical use particularly in the field of automobile. Some are of a type which uses a knob, lever or like equipped thereto for manually adjusting the angular position of the headrest. However, the provision of such a hard protuberance to the headrest deteriorates not only the external appearance of the same but also the safety of the passengers in the vehicle.

SUMMARY OF THE INVENTION

It is therefore an essential object of the present invention to provide a headrest the angular position adjustment of which is achieved without using such protuberances.

According to the present invention, there is provided a headrest the angular position of which can be adjusted by only handling the headrest proper.

According to the present invention, there is provided an angular position adjustable headrest mounted on a seatback of a seat, which comprises: a supporting device adapted to be mounted on the seatback; a pivot shaft supported by the supporting device; a headrest frame including a hollow body with first and second side plates, the headrest frame being pivotally arranged relative to the supporting device in a manner to pivot about the axis of the pivot shaft between first and second extreme positions; position locking means arranged between the supporting device and the headrest frame so as to lock the headrest frame to a selected one of angular positions of the headrest frame relative to the supporting device; and a lock cancelling plate pivotally disposed on the pivot shaft to pivot about the axis of the same, the lock cancelling plate disabling the position locking means when the headrest proper is pivoted to the first extreme position.

BRIEF DESCRIPTION OF THE DRAWINGS

Other objects and advantages of the present invention will become apparent from the following description when taken in conjunction with the accompanying drawings, in which:

FIG. 1 is a perspective view of a headrest of the present invention showing the interior of the same by the solid line;

FIG. 2 is a side view of the headrest with some parts removed for clarification of the drawing; and FIGS. 3 to 6 are views similar to FIG. 2, but showing respectively various conditions of the headrest of the invention.

DETAILED DESCRIPTION OF THE INVENTION

Figure 5:
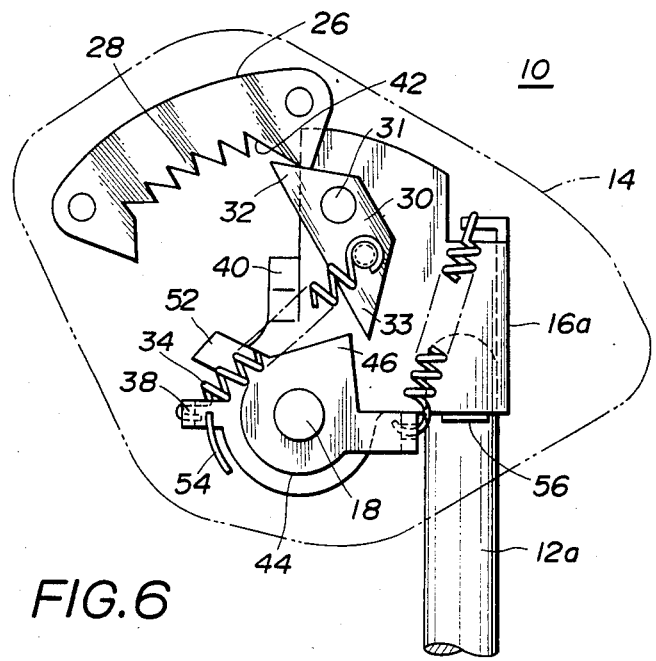

Referring to FIGS. 1 and 2, there is shown a headrest 10 according to the present invention, which generally comprises a stay 12 detachably mounted to a seatback (not shown) of a seat, two brackets 16a and 16b fixed to the stay 12 and a headrest proper 14 pivotally connected to the brackets 16a and 16b. In these drawings, the headrest 10 is illustrated with its left side facing the back of the head of a seat occupant (not shown).

The stay 12 has a generally U-shaped configuration consisting of two parallel leg portions 12a and 12b detachably mounted to the seatback and a bridge portion 12c extending between the leg portions 12a and 12b.

The two brackets 16a and 16b are respectively secured to the axially spaced ends of the bridge portion 12c of the stay 12, as shown in FIG. 1. Each bracket 16a or 16b has a generally L-shaped configuration including a base wall portion (no numeral) and a side wall portion (no numeral) normal to the base wall portion. The brackets 16a and 16b are arranged on the stay 12 with their side wall portions facing toward each other.

The headrest proper 14 comprises a pivot shaft 18 which passes through aligned openings (no numerals) formed in the facing side wall portions of the brackets 16a and 16b and is secured to the side wall portions. A pillow-like headrest frame 20 including a hollow body with side plates 20a and 20b is pivotally mounted to the pivot shaft 18. For this pivotal mounting, the side plates 20a and 20b have respective openings through which the axially opposed end portions of the pivot shaft 18 pass. The headrest frame 20 is covered with a thick padding 22.

A coil spring 24 is arranged between the base wall portion of the bracket 16b and the side plate 20b to bias the headrest frame 20 to pivot about the axis of the pivot shaft 18 in the clockwise direction in FIG. 1, that is, toward the rearmost position of the same.

A toothed member 26 is secured to the inboard surface of the side plate 20a to move therewith. The member 26 is formed, at a side facing the pivot shaft 18, with teeth 28 which are arranged to be concentric with the pivot shaft 18.

A pawl member 30 is pivotally connected through a pivot pin 31 to the outboard surface of the side wall portion of the bracket 16a. The pawl member 30 has upper and lower pawl parts 32 and 33. The upper pawl part 32 is pressed against the teeth 28 by a coil spring 34 (see FIG. 2) which is arranged between the pawl member 30 and the side wall portion of the bracket 16a. For connecting the coil spring 34, the pawl member 30 is provided with a pin 36, and the side wall portion of the bracket 16a is formed with a projection 38, as shown. Designated by numeral 40 in FIG. 2 is a stopper which is provided to the outboard surface of the side wall portion of the bracket 16a to suppress extreme turning of the pawl member 30 in the clockwise direction in FIG. 2. As is understood from this drawing, the teeth 28 of the toothed member 26 and the upper pawl part 32 of the pawl member 30 are so designed that the upper pawl part 32 move on the teeth 28 in "only" the rightward direction, that is, in the clockwise direction in FIG. 2.

As is seen from FIG. 2, the toothed member 26 is formed as its right end with a longer inclined edge 42 which is merged with an inclined edge of the rightmost tooth of the teeth 28. As will become as the description proceeds, when the headrest proper 14 is tilted in the counterclockwise direction to its foremost position, the upper pawl part 32 of the pawl member 40 rides on the longer inclined edge 42, cancelling the meshing engagement with the teeth 28.

A lock cancelling plate 44 is journaled about the pivot shaft 18 at the position betwee the side plate 20a and the side wall portion of the bracket 16a. As will become apparent as the description proceeds, the plate 44 functions to hold the pawl member 30 at the toothed member releasing condition. The plate 44 is formed with a triangular lug portion 46 which is engageable with the lower pawl part 33 of the pawl member 30. The plate 44 is further formed with a stopper 48 (see FIG. 1) which is bent to extend under the side wall portion of the bracket 16a. A coil spring 50 is arranged between the bracket 16a and the plate 44 to bias the latter to rotate in the counterclockwise direction in FIG. 2. With the provision of the stopper 48 which is engageable with the lower edge of the bracket 16a, the extreme counterclockwise rotation of the plate 44 is suppressed. As is seen from FIG. 2, the upper end of the spring 50 is hooked to a lug (no numeral) of the bracket 16a and the lower end of the same is hooked to the stopper 48. The plate 44 is further formed with a projection 52 at the opposite side of the stopper 48. An arcuate projection 54 is formed on the inboard surface of the side plate 20a at the position to which the projection 52 of the plate 44 is engageable. That is, as will be described in detail hereinafter, when the headrest proper 14 is pivoted to its rearmost position from the foremost position, the arcuate projection 54 moved with the headrest proper 14 comes to contact with the projection 52 and pushes the same to rotate the plate 44 clockwise in FIG. 2 against the biasing force of the spring 50.

Designated by numeral 56 in FIG. 2 is a stopper which is secured to the side plate 20a of the headrest frame 20. The stopper 56 comes to contact with the lower edge of the bracket 16a when the headrest proper 14 is tilted to its foremost position.

In the following, operation of the headrest 10 will be described with reference to the drawings.

For facilitation, the description will be commenced with respect to the condition as shown in FIGS. 1 and 2. In this condition, the headrest proper 14 assumes its rearmost position wherein the upper pawl part 32 of the pawl member 30 is lockingly engaged with the foremost notch of the teeth 28 of the toothed member 26. Under this condition, clockwise rotation of the headrest proper 14 is suppressed due to the locking engagement between the pawl member 30 and the toothed member 26.

When, upon requirement of angular position change, the headrest proper 14 is applied with a certain force by operator's hand in the counterclockwise direction, the headrest proper 14 is pivoted counterclockwise about the axis of the pivot shaft 18 sliding the teeth 28 of the toothed member 26 forward on the upper pawl part 32 of the pawl member 30.

When, during this pivoting, the force application to the headrest proper 14 stops, the headrest proper 14 stops at a certain angular position with one of the teeth 28 lockingly engaged with the pawl member 30. With this, the headrest proper 14 can be settled at a desired angular position relative to the stay 12 on the seatback.

When stopping the headrest proper 14 to the desired angular position fails, the counterclockwise pivoting of the same is continued until the headrest proper 14 comes to the foremost position. As shown in FIG. 3, in this condition, the upper pawl part 32 of the pawl member 30 is in engagement with the rearmost notch of the teeth 28. Further pivoting of the headrest prope 14 in the same divection causes the longer inclined edge 42 of the toothed member 26 to ride on the upper pawl part 32 of the pawl member 30, pivoting the pawl member 30 in the counterclockwise direction about the pivot pin 31, as is seen from FIG. 4. The counterclockwise pivoting of the pawl member 30 brings about an abutment between the lower pawl part 33 of the pawl member 30 and the triangular lug portion 46 of the plate 44 thereby pivoting the plate 44 in the clockwise direction about the pivot shaft 18 as is seen from FIG. 4, and finally, as is seen from FIG. 5, the lower pawl part 33 of the pawl member 30 is disengaged from the triangular lug portion 46 of the plate 44. Under this fully forward tilted condition, the stopper 56 on the side plate 20a of the headrest frame 20 is in contact with the lower edge of the bracket 16a.

Figure 6:
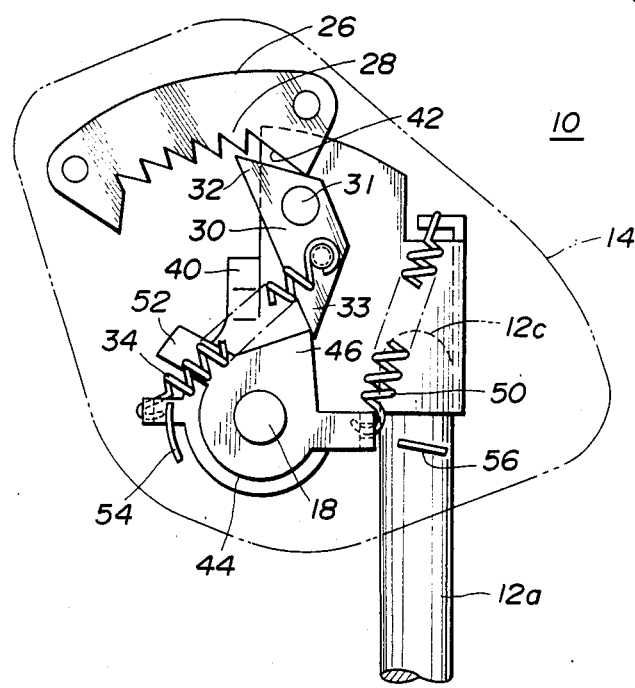

When, thereafter, the headrest proper 14 is applied with a certain force in the reversed direction, that is, in the clockwise direction in FIG. 6, the lower pawl part 33 of the pawl member 30 is brought into contact with the triangular lug portion 46 of the plate 44 and thus thereafter the pawl member 30 is prevented from pivoting in the clockwise direction. Thus, the headrest proper 14 can be smoothly returned to the initially set rearmost position without inducing locking engagement between the pawl member 30 and the teeth 28. Upon the headrest proper 14 returning to the rearmost position, the arcuate projection 54 of the side plate 20a contacts and thus pushes the projection 52 of the plate 44 thereby pivoting the same in the clockwise direction against the force of the spring 50 and thus releasing the lower pawl part 33 of the pawl member 30 from the triangular lug portion 46 of the plate 44. With this, due to the biasing force of the spring 34, the pawl member 30 is returned to the position of FIG. 2 wherein the upper pawl part 32 thereof is lockingly engaged with the foremost notch of the teeth 28 of the toothed member 26 and the lower pawl part 33 is disengaged from the plate 44.

Thereafter, forward pivoting of the headrest proper 14 is carried out again for achieving the desired angular positioning of the same in the afore-mentioned manner.

It is to be noted that the present invention is not limited to the afore-described embodiment. That is, for example, the pivot shaft 18 may be pivotal to the brackets 16a and 16b. In this case, the side plates 20a and 20b of the headrest frame 20 are secured to the pivot shaft 18. If desired, the side plates 20a and 20b may be pivotal to the pivot shaft 18.

What is claimed is:

1. An angular position adjustable headrest mounted on a seatback of a seat, comprising:
   a supporting device comprising a stay detachably mounted to said headrest and two spaced brackets secured to said stay, said supporting device mounted on said seatback;
   a pivot shaft supported by said supporting device;
   a headrest frame including a hollow body with first and second side plates, each of said plates having aligned openings through which said pivot shaft passes, said headrest frame being pivotally arranged with respect to said supporting device in a manner to pivot about an axis of said pivot shaft between first and second extreme positions;
   position locking means comprising a toothed member secured to one of said side plates of the headrest frame and a pawl member pivotally connected to said supporting device, said pawl member having first and second pawl parts disposed at opposite ends thereof with respect to the pivotable portion, said first pawl part being lockably engaged with the teeth of the toothed member in such a manner that when said headrest frame assumes positions other than said first extreme position, only a pivoting movement of said headrest frame in the direction toward said first extreme position is permitted; and a lock cancelling plate pivotally disposed on said pivot shaft to pivot about the axis of the same, said lock cancelling plate being engageable with said second pawl part to disable said position locking means when said headrest frame is pivoted to said first extreme position.

2. An angular position adjustable headrest as claimed in claim 1, in which said toothed member is formed with an inclined edge, said inclined edge being brought into engagement with said first pawl part of said pawl member to cancel said locking engagement between the toothed member and pawl member when said headrest frame is pivoted to said first extreme position.

3. An angular position adjustable headrest as claimed in claim 2, in which said lock cancelling plate has first and second projections, said first projection being engageable with said second pawl part of said pawl member to hold said first pawl part of the same disengaged from the teeth of the toothed member.

4. An angular position adjustable headrest as claimed in claim 3, further comprising a third projection provided to said first side plate of the headrest frame, said third projection being so arranged that when said headrest frame is pivoted to said second extreme position, said third projection is brought into engagement with said second projection of said lock cancelling plate to pivot said lock cancelling plate in a direction to disengage said first projection from said second pawl part of the pawl member.

5. An angular position adjustable headrest as claimed in claim 4, further comprising second biasing means for biasing said lock cancelling plate to pivot in a direction to move said second projection toward said third projection.

6. An angular position adjustable headrest as claimed in claim 5, in which said toothed member is formed with said inclined edge at an extreme end of said teeth thereof, said inclined edge being merged with that of an adjacent tooth of the teeth.

7. An angular position adjustable headrest as claimed in claim 6, in which said inclined edge of said toothed member rides on said first pawl part of the pawl member when said headrest frame is pivoted to the first extreme position.

8. An angular position adjustable headrest as claimed in claim 7, in which said second pawl part of the pawl member is disengaged from said first projection of the lock cancelling plate when said headrest frame is pivoted to the first extreme position.

9. An angular position adjustable headrest as claimed in claim 8, in which said second pawl part of said pawl member is brought into engagement with said first projection of the lock cancelling plate thereby to prevent the first pawl part of the pawl member from engaging with any one of the teeth of the toothed member when the headrest proper is pivoted from the first extreme position to the second extreme position.

10. An angular position adjustable headrest as claimed in claim 9, further comprising third biasing means for biasing said headrest frame to pivot in a direction from the first extreme position to the second extreme position.

11. An angular position adjustable headrest as claimed in claim 10, further comprising a stopper for stopping the extreme pivoting movement of said pawl member relative to said brackets.

12. an angular position adjustable headrest as claimed in claim 11, further comprising a stopper for stopping the extreme pivoting movement of the lock cancelling plate relative to said brackets.

13. An angular position adjustable headrest as claimed in claim 12, in which said first projection of said lock cancelling plate is formed to have a pointed top.

* * * * *